United States Patent Office 3,055,845
Patented Sept. 25, 1962

3,055,845
POLYURETHANE PLASTICS
Rudolf Merten, Köln-Mulheim, and Günther Loew, Koln, Germany, assignors to Farbenfabriken Bayer Aktiengesellschaft, Leverkusen, Germany, a corporation of Germany
No Drawing. Filed Jan. 12, 1960, Ser. No. 1,883
Claims priority, application Germany Jan. 29, 1959
8 Claims. (Cl. 260—2.5)

This invention relates to polyurethane plastics and, more particularly, to a method for catalyzing the reaction between an organic isocyanate and an organic compound containing an active hydrogen containing group.

Polyurethane plastics are prepared by reacting organic compounds containing active hydrogen containing groups with organic polyisocyanates. If necessary, water or some other blowing agent is incorporated into the reaction mixture to produce a cellular polyurethane plastic. In the preparation of polyurethane plastics, organic compounds containing primary hydroxyl groups such as hydroxyl polyesters, polyhydric polyalkylene ethers, polyhydric polyalkylene thioethers and polyacetals are conventionally used. The primary hydroxyl groups react rapidly with isocyanate groups and, therefore, insure rapid formation of a cellular structure when the poly-addition reaction proceeds concurrently with the evolution of carbon dioxide from the reaction between the isocyanate groups and water. The secondary hydroxyl groups are less reactive and therefore, it is more difficult to prepare polyurethanes therefrom.

Organic compounds containing predominantly secondary hydroxly groups also have a lower initial viscosity than the organic polyisocyanates due to the less polar structure of this type of organic compounds. It is, therefore, difficult to achieve satisfactory mixing of organic compounds containing predominantly secondary hydroxyl groups so as to harmonize the simultaneous reaction of the organic polyisocyanate with water to produce carbon dioxide and with the organic compound containing predominantly secondary hydroxyl groups to produce polymers so that a cellular structure results. For this reason it has been preferred to carry out the reaction between the organic polyisocyanate and the organic compound containing predominantly secondary hydroxyl groups in a first step to produce an initial adduct having terminal —NCO groups and then react this initial adduct with water and, if necessary, additional organic polyisocyanate to produce the cellular polyurethane plastic. By carrying out the reactions in separate stages it is possible to overcome the difficulty involved in trying to harmonize the reactions.

It is also possible to carry out the reaction between an organic compound containing predominantly secondary hydroxyl groups and an organic polyisocyanate with the concurrent production of carbon dioxide in a single working step provided that a strongly basic catalyst such as endoethylene piperazine is included in the reaction mixture. The presence of the strongly basic catalyst results in a substantial increase in secondary reactions such as polymerization reactions which undesirably influence the properties of the cellular polyurethane plastic produced.

It has been heretofore proposed in U.S. Patent 2,846,408 to employ nonbasic polyvalent metal salts of carboxylic acids or metal alcoholates as catalysts for the reaction between an organic polyisocyanate and an hydroxyl polyester. It is often necessary, in order to effectively catalyze the reaction with these compounds, to use critical amounts, if a stable cellular polyurethane plastic is to result.

It is, therefore, an object of this invention to provide an improved method of catalyzing the reaction between an organic isocyanate and an organic compound containing at least one active hydrogen containing group. Another object of this invention is to provide an improved method for the preparation of cellular polyurethane plastics. Another object of this invention is to provide an improved method of catalyzing the reaction between an organic polyisocyanate and an organic compound containing at least two active hydrogen containing groups. Still another object of this invention is to provide a method of catalyzing the reaction between an organic polyisocyanate and an organic compound containing at least two active hydrogen containing groups to produce a cellular polyurethane plastic. Still another object of this invention is to provide improved tin containing catalysts for the preparation of cellular polyurethane plastics from organic polyisocyanates and organic compounds containing at least two active hydrogen containing groups. Still another object of this invention is to provide improved cellular polyurethane plastics. A further object of the invention is to provide improved cellular polyurethane plastics obtained from an organic polyisocyanate and a polyhydric polyalkylene ether or thioether. Still another object of the invention is to provide improved cellular polyurethane plastics and an improved method for the preparation thereof from organic polyisocyanates and polyhydric polyalkylene ethers containing predominantly secondary hydroxyl groups.

The foregoing objects and others, which will become apparent from the following description, are accomplished in accordance with the invention, generally speaking, by providing a method of catalyzing the reaction between an organic isocyanate and an organic compound containing at least one active hydrogen containing group as determined by the Zerewitinoff method, said active hydrogen containing group being reactive with an —NCO group, wherein the said components are mixed in the presence of a chelate of tin having at least one carbon to tin bond. Thus, this invention contemplates a process for the preparation of polyurethanes by reaction of an organic polyisocyanate with an organic compound containing at least two active hydrogen containing groups, said reaction being carried out in the presence of a tin chelate having at least one carbon to tin bond. In a preferred embodiment of the invention, cellular polyurethane plastics are produced by combining an organic polyisocyanate with an organic compound containing at least two active hydrogen containing groups and a blowing agent such as water or a halohydrocarbon, such as, for example, dichlorodifluoromethane, trifluorochloromethane and the like in the presence of a tin chelate containing at least one carbon to tin bond.

Any suitable tin chelate may be used provided that it contains at least one carbon to tin bond. It is preferred to employ chelates of tetravalent tin in which each tin atom is attached to an organic radical by means of at least one carbon to tin bond. Any suitable organic radical may be used to form the carbon to tin bond including for example, aliphatic, cycloaliphatic, aromatic and heterocyclic radicals which may also be substituted with any other suitable substituent which does not interfere with the catalytic activity of the tin chelate, such as, for example, halogeno such as, for example, chloro, bromo, iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

When aliphatic radicals are the organic radicals, they may be for example, alkyl, alkenyl, aralkyl, aralkenyl, and the like.

Any suitable alkyl radical may be the organic radical such as, for example, methyl, ethyl, n-propyl, isopropyl, n-butyl, isobutyl, sec-butyl, t-butyl, n-amyl and various isomers thereof such as, for example, 1-methyl-butyl, 2- methyl-butyl, 1,1-dimethylpropyl, 1,2-dimethylpropyl, 2,2-dimethylpropyl,1-ethylpropyl and the like and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like.

Any suitable alkenyl radical may be the organic radical such as, for example, ethenyl, 1-propenyl, 2-propenyl, isopropenyl, 1-butenyl, 2-butenyl, 3-butenyl and the corresponding branched chain isomers thereof such as, for example, 1-isobutenyl, 2-isobutenyl, 1-sec-butenyl, 2-sec-butenyl, including 1-methylene-2-propenyl, 1-pentenyl, 2-pentenyl, 3-pentenyl, 4-pentenyl and the corresponding branched chain isomers thereof; 1-hexenyl, 2-hexenyl, 3-hexenyl, 4-hexenyl, 5-hexenyl and the corresponding branched chain isomers thereof such as, for example, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable aralkyl radical may be the organic radical such as for example, benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl and the corresponding α'- and β'-naphthyl derivatives of n-amyl and the various positional isomers thereof such as, for example, 1-methyl-butyl, 2-methyl-butyl, 3-methyl-butyl, 1,1-dimethyl-propyl, 1,2-dimethyl-propyl, 2,2-dimethyl-propyl, 1-ethyl-propyl and said derivatives of the corresponding isomers of hexyl, heptyl, octyl and the like including eicosyl and the corresponding alkyl derivatives of phenanthrene, fluorene, acenaphthene, chrysene, pyrene, triphenylene, naphthacene and the like.

Any suitable aralkenyl radical may be the organic radical such as, for example, α-phenyl-ethenyl, β-phenyl-ethenyl, α-phenyl-1-propenyl, β-phenyl-1-propenyl, gamma-phenyl-1-propenyl, α-phenyl-2-propenyl, β-phenyl-2-propenyl, gamma-phenyl-2-propenyl, β-phenyl-isopropenyl and phenyl derivatives of the isomers of butenyl, pentenyl, hexenyl, heptenyl up to and including eicosenyl and other aromatic derivatives of alkenyl, that is alkenyl radicals derived from naphthalene, phenanthrene, fluorene, acenaphthene, chrysene, pyrene, triphenylene, naphthacene and the like.

When cycloaliphatic radicals are the organic radicals, they may be for example, cycloalkyl, cycloalkenyl and the like.

Any suitable cycloalkyl radical may be the organic radical such as, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclonondecyl, cycloeicosyl, α-cyclopropyl-ethyl, β-cyclopropyl-ethyl, α-cyclobutyl-propyl, β-cyclobutyl-propyl, gamma-cyclobutyl-propyl, α-cycloamyl-isopropyl, β-cycloamyl-isopropyl and the like.

Any suitable cycloalkenyl radical may be the organic radical such as, for example, cyclopentenyl, α-cyclohexyl-ethenyl, β-cyclohexyl-ethenyl, α-cycloheptyl-1-propenyl, β-cycloheptyl-1-propenyl, gamma-cycloheptyl-1-propenyl, α-cyclooctyl-2-propenyl, β-cyclooctyl-2-propenyl, gamma-cyclooctyl-2-propenyl, β-cyclononyl-isopropenyl, α-methylene-β-cyclododecyl-ethyl, cyclopentadienyl and the like.

Where aromatic radicals are the organic radicals, they may be for example aryl, alkaryl and the like.

Any suitable aryl radical may be the organic radical such as, for example, phenyl, α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable alkaryl radical may be the organic radical such as, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl - α - naphthyl, 4 - methyl - α - naphthyl, 5 - methyl-α-naphthyl, 6-methyl-α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-β-naphthyl, 7-ethyl-β-naphthyl, 8-ethyl-β-naphthyl, 2,3-dipropyl-α-naphthyl, 5,8-diisopropyl-β-naphthyl and the like.

When heterocyclic radicals are the organic radicals, they may contain any suitable hetero atom such as, for example, sulphur, oxygen and the like. Any suitable heterocyclic radical may, therefore, be the organic radical such as, for example, α-furfuryl, β-furfuryl, thienyl and the like.

The chelate forming or complex forming components which may be used to form the tin chelates of the present invention form a main-valency and secondary-valency bond with formation of ring systems which preferably have five or more members and most preferred are those with five or six ring members. Tetravalent tin compounds containing two organic radicals linked to tin through a carbon to tin bond are preferred, since a coordination number of six is obtained when the molecule is saturated. If three organic radicals are bonded to tin through a carbon to tin bond, then the coordination number of the resulting saturated compound is only five and if only one organic radical is bonded to tin through a carbon to tin bond, then a secondary-valency bond is not available to form a chelate complex. Compounds having only one organic radical bonded to tin through a carbon to tin bond may be used, however, if desired and if some other bonding provision is made to yield a coordination number which will form a secondary-valency bond. The chelate forming components may be substituted in any desired manner provided that the substituents do not interfere with the capacity of the compound to form a chelate complex with tin. The chelate forming compound, in other words contains (a) at least one group A which is linked to the tin atom through a main-valency bond. Such groups A are hydroxyl groups including keto groups in their enolic form and carboxyl groups, and (b) in suitable above-outlined steric configuration at least one group B which provides for free electron pairs capable of forming a secondary-valency bond with the tin atom. Such groups B are CO-groups such as keto-, ester- and amido groups, as well as Schiff's base groups =N— or other linkages —O—. The sulfur analoga can replace the described oxygen containing groups.

Suitable compounds which will form a chelate with tin as defined are, for example, β-diketones, o-hydroxyphenones, acetoacetic esters and the like including for example, acetyl acetone, benzoyl acetone, propionyl acetone, dibenzoylmethane, 2-furoyl acetone, 2-furoylbenzoylmethane, 2-thenoyl acetone, 2,2'-dithenoylmethane, trifluoroacetyl acetone, benzoyltrifluoroacetone, 2-thenoyltrifluoracetone, hexafluoroacetylacetone, ethyl acetoacetic ester, cyclopentanone-2-carboxylic acid ethyl ester, salicylaldehyde, p-t-butylsalicylaldehyde and o-hydroxynaphthaldehyde. The reaction products of the aforementioned keto compounds with diamines such as ethylene diamine may also be used as chelate forming components as well as compounds having a double chelate forming configuration in the molecule.

The catalysts employed in the process according to the present invention may be prepared in various ways. Thus, compounds of the general formula $$R_nSn(OCH_3)_{4-n}$$

in which R is an organic radical as defined above and $n$ is an integer from 1 to 3 and which are described in United States Patent No. 2,727,917 can be transesterified with the appropriate chelate former, methanol being split off. Another method of preparing the catalysts is by the reaction of a tin halide having the formula $$R_nSn(halogen)_{4-n}$$

in which R and $n$ have the previously specified meanings with the chelate former with formation of, for example, $K_2CO_3$ and with azeotropic removal of the water which is formed. By suitable choice of components and quantitative ratios, it is possible to produce linear or branched products of both low-molecular weight and high-molecular weight. The metal compounds can, of course, also be mixed in any desired manner.

Instead of tin compounds containing only one tetravalent tin atom in the molecule, it is also possible to use complexes of stannoxanes containing Sn—O—Sn-groupings in the molecule and in which each tin atom is attached to an organic radical by means of at least one carbon to tin bond.

The tin compounds, depending on their nature, are solid, amorphous, pasty or even liquid and viscous products, and may be added in several different ways to the reaction components to be foamed. Thus, the liquid tin compounds are generally of good compatibility with the polyethers and polyesters and can be immediately added thereto. Solid tin compounds can be dissolved in solvents, such as acetone, aromatic hydrocarbons, chlorinated hydrocarbons and ethers or in one of the reaction components. They can, however, also be added in solid form to the reaction mixture to be foamed or in the form of a paste with the polyhydroxy compound. The quantities of catalyst which are necessary vary considerably and naturally depend on the nature and composition of the reaction mixture which is to be foamed. On the other hand, the active tin-content of the catalysts varies according to the tin compounds which are used. Generally speaking, the catalysts are employed in an amount of from about 0.001 percent to about 5.0 percent by weight, based on the weight of the reaction mixture.

The tin catalysts of the present invention are particularly useful in the production of cellular polyurethane plastics. They represent an improvement over the heretofore known catalysts because lesser amounts are required to achieve the same effect and, moveover, they do not exert adverse effects on the final product.

Any suitable organic compound containing at least one active hydrogen containing group as determined by the Zerewitinoff method, said group being reactive with an —NCO group, may be used for reaction with organic isocyanates. Suitable compounds include, therefore, alcohols, phenols, polyhydric alcohols, polyhydric polyalkylene ethers, polyhydric polyalkylene thioethers, hydroxyl polyesters, hydroxyl polyester amides, polyacetals and the like.

Generally speaking, all the heretofore known organic compounds containing an active hydrogen containing group which will react with an —NCO group are contemplated. The presence of these groups may be determined by the well-known Zerewitinoff method, J. Am. Chem. Soc. 49, 3181 (1927). Therefore, the active hydrogen containing groups may be, for example, hydroxyl groups, primary amino groups, secondary amino groups, carboxy groups (—COOH), mercapto groups, enolizable methylene groups and the like.

Therefore, any of the alcohols, phenols, amines and the like set forth above may be reacted with an organic isocyanate in the presence of the tin compounds of the present invention. The invention, therefore, contemplates the alcohols, phenols, and the like obtained by adding one or more of the above defined groups to any of the organic radicals set forth above. The invention, therefore, contemplates the catalysis of the reaction between any organic compound having an active hydrogen containing group and an organic isocyanate including the reaction of methanol, ethanol, ethyl amine, phenol, aniline, acetic acid and the like with any of the isocyanates disclosed below.

In a preferred embodiment of the invention organic compounds containing at least two active hydrogen containing groups as defined above are reacted with organic polyisocyanates in the presence of the organo-tin compounds to prepare polyurethane plastics. This procedure is best adapted to the production of cellular polyurethane plastics.

The organic compounds containing at least two active hydrogen containing groups may, therefore, be prepared from alkylene oxides such as, for example, propylene oxide, butylene oxide, 1,2-amylene oxide, and the like as well as aralkylene oxides such as, for example, styrene oxide. The epihalohydrins may also be used, such as, for example, epichlorohydrin and the like. Also, organic compounds containing at least two active hydrogen containing groups may be prepared by condensing one of the aforementioned types of oxides with any suitable polyhydric alcohol such as, for example, alkane diols such as, for example, ethylene glycol, 1,3-propane diol, 1,4-butane diol, 1,3-butane diol, 1,2-isopropane diol, 1,3-isobutane diol, 1,5-pentane diol, 1-methyl pentane-1,4-diol, 1,6-hexane diol, 1,7-heptane diol, 1,8-octane diol, 1,16-pentadecane diol and the like, alkane triols such as, for example, 1,3,6-hexanetriol, glycerine and the like, alkane polyols such as sorbitol, alkene diols such as, for example, 1,2-ethene diol, 1-butene-1,4-diol, propene-1,3-diol and the like, alkine diols such as, for example, 1,3-butadine-1,4-diol, polyhydric ethers such as, for example, trimethylol propane, pentaerythritol, polyethylene ether glycols, polypropylene ether glycols and the like and phenols such as, for example, hydroquinone, 4,4'-dihydroxyl diphenyl methane, 4,4'-dihydroxy diphenyl dimethyl methane, 1,5-dihydroxy naphthalene and the like. Also one may condense the aforementioned oxides with aliphatic or aromatic polyamines such as for example, alkylene diamines such as, for example, ethylene diamine and the like, alkylene triamines such as, for example, triethylene diamine and the like, aromatic amines such as, for example, aniline, p-amino aniline and the like and heterocyclic amines such as, for example, piperazine and the like. Condensation products of the aforementioned oxides with amino alcohols such as, for example, alkanol amines such as, for example, ethanol amine and the like, N-alkyl alkanol amines such as, for example, N-methyl ethanol amine and the like, dialkanol amines such as, for example, diethanol amine and the like, N-alkyl dialkanol amines such as, for example, N-methyl diethanol amine, trialkanol amines such as, for example, triethanol amine and the like, N,N,N',N'-tetrakis (2-hydroxy propyl) ethylene diamine and the like and phenol amines such as, for example, p-amino phenol and the like may also be used. One may also employ condensation products of the aforementioned oxides with hydroxyl polyesters such as are obtained for example for polycarboxylic acids and polyhydric alcohols or the reaction product of castor oil, sugar or the like. Any suitable polycarboxylic acid may be used such as, for example, malonic acid, succinic acid, glutaric acid, adipic acid, phthalic acid, terephthalic acid, sebacic acid, suberic acid, maleic acid, itaconic acid and the like. Any suitable polyhydric alcohol may be used such as, for example, 1,4-butane diol, trimethylol propane, pentaerythritol or the like. Polyesters prepared from these components may be used without modification with the oxides. It is preferred that they have terminal hydroxyl groups.

Ethylene oxide may be partially incorporated into the oxides recited above by carrying out the condensation of the oxides recited above in the presence of ethylene oxide or by subsequently condensing the polymers recited above with ethylene oxide. The resulting polyhydroxy compounds containing a minor proportion of ethylene oxide do not differ substantially from the aforementioned polyhydroxy compounds as regards their reactivity with respect to polyisocyanates. Polyhydroxy compounds containing secondary hydroxyl groups can also be produced by esterifying one or more of the previously mentioned polyalcohols, some of which may already contain secondary hydroxyl groups, with a deficient quantity of a polycarboxylic acid, such as succinic acid, adipic acid, sebacic acid, dimerised and trimerised fatty acids, phthalic acid, maleic acid and fumaric acid, it being possible simultaneously to incorporate tertiary nitrogen atoms or carbonamide groups into the polyesters by the concurrent use of amino alcohols. In addition to the preferred polyhydroxy compounds containing secondary hydroxyl groups, it is also possible to use compounds which contain primary hydroxyl groups. Such compounds can for example be obtained by the esterification of the aforementioned primary polyalcohols or amino alcohols with the aforementioned polycarboxylic acids. This group of compounds also includes a wide variety of polyethers, such as those derived from ethylene glycol, tetrahydrofuran and also thiodiglycol as well as various polyacetals, such as are obtained for example from polyhydric alcohols, such as, for example, ethylene glycol and the like disclosed above and aldehydes, such as formaldehyde.

The linear and branched organic compounds containing active hydrogen containing groups employed in the process according to the present invention should have an acid number below about 15 and preferably from 0 to about 2 when they are derived from polyesters. All types of the organic compounds containing at least two active hydrogen containing groups should preferably have a molecular weight of at least about 500 and an —OH equivalent of from about 100 to about 3000 if the only active hydrogen groups are hydroxyl groups. By "—OH equivalent" is meant the amount of the compound in grams which contains 1 mol of hydroxyl groups. The aforementioned compounds may be mixed in any desired manner with the organic isocyanate. They may, also be employed in admixture with the aforementioned low-molecular weight compounds provided the —OH equivalent of the mixture is between about 100 and about 3000.

Any suitable organic isocyanate may be used including aliphatic, cycloaliphatic, alkaryl, aralkyl, heterocyclic and aryl mono and polyisocyanates, such as, for example, ethyl isocyanate, propyl isocyanate, butyl isocyanate, pentyl isocyanate, hexyl isocyanate, heptyl isocyanate, octyl isocyanate and the like including eicosyl isocyanate. As diisocyanates, there may be used tetramethylene diisocyanate, pentamethylene diisocyanate, octamethylene diisocyanate, dodecamethylene diisocyanate, 3,3'-diisocyanato dipropyl ether, cyclohexyl isocyanate, tetrahydro-α-naphthyl isocyanate, tetrahydro-β-naphthyl isocyanate, xylylene diisocyanates, p,p'-diphenylmethane diisocyanate, β,β'-diphenylpropane, 4,4'-diisocyanate and the like. Other examples are benzyl isocyanate, undecamethylene diisocyanate, p-isocyanato benzyl isocyanate, phenyl isocyanate, p-dodcyl phenyl isocyanate, 5-dodecyl-2-methyl phenyl isocyanate, 3-nitro-4-dodecyl phenyl isocyanate, p-cetyloxy phenyl isocyanate, m-phenylene diisocyanate, p-phenylene diisocyanate, 1-methyl phenylene 2,4-diisocyanate, naphthylene 1,4-diisocyanate, naphthylene 1,5-diisocyanate, 2,6-toluylene diisocyanate, 1,3,5-benzene triisocyanate, p,p',p"-triphenylmethane triisocyanate, tetrahydrofurfuryl isocyanate and the like.

Also the addition products of polyisocyanates with a deficient quantity of a low-molecular weight alcohol, such as 1,4-butane diol, glycerine, trimethylol propane, the hexanediols and hexanetriols and addition products of the aforementioned polyisocyanates with low-molecular weight polyesters, such as castor oil, may also be used, as well as the reaction products of the aforementioned polyisocyanates with acetals as described in copending application Serial No. 821,360. Also suitable are the isocyanate polymers described in German patent specifications Nos. 1,022,789 and 1,027,394, as laid open to inspection. Mixtures of organic isocyanates may also be employed. The process according to the present invention can also be used for the foaming of the "initial adducts" obtained from the aforementioned organic compounds containing at least two active hydrogen containing groups and an excess of polyisocyanate by adding water.

The cellular polyurethane plastics are produced in accordance with the invention by the simultaneous intensive mixing of the components including the organic compound containing at least two active hydrogen containing groups, the organic polyisocyanate and the tin compound together with water and/or other additives. The mixing of these components is preferably effected mechanically for example in the manner described in U.S. Reissue Patent 24,514 to Hoppe et al., issued August 12, 1958. It is also possible to prepare a prepolymer by reaction of the organic polyisocyanate and the organic compound containing at least two active hydrogen containing groups in a first step and then reacting the resulting isocyanate terminated prepolymer with water in a second step in the presence of the tin compounds of the present invention to prepare a cellular polyurethane plastic.

A wide range of different additives can be added to the reaction mixture in the production of cellular polyurethane plastics. Thus, it is sometimes convenient to use emulsifiers such as, for example, sulphonated castor oil and/or adducts of ethylene oxide with hydrophobic compounds containing one or more active hydrogen atoms, foam stabilizers such as, for example, siloxane oxyalkylene block copolymers having the formula

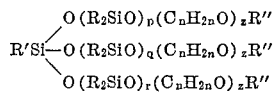

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer. A process which combines the catalyst and this stabilizer is contemplated by the invention as a preferred embodiment. Silicone compounds represented by the above formula and a method for making them are disclosed in U.S. Patent 2,834,748 to Bailey et al.

Accelerator compounds containing basic nitrogen in the molecule may also be used as additive compounds which will aid in the production of regular pore size in the final product such as, for example, paraffin oils and a variety of silicone oils such as, for example, dimethyl polysiloxanes and the like, in addition to dyestuffs, fillers, flame-proofing agents and plasticizers.

The tin catalyst of the present invention may also be employed with the heretofore known basic accelerators such as, for example, tertiary amines such as, for example, dimethyl benzylamine, 1-ethoxy-3-dimethylaminopropane, endoethylene piperazine in small quantities, permethylated-N-ethylaminopiperazine and dimethyl ethyl amine as well as metal compounds such as, for example, alkali metal hydroxides such as, for example, sodium hydroxide, alkali metal carbonates such as, for example, sodium carbonates, alkali metal phenolates such as, for example, sodium phenoxide and alkali metal alcoholates such as, for example, sodium methoxide.

The cellular polyurethane plastics produced in accordance with the present invention have excellent mechanical and physical properties and their bulk density can be modified in known manner by varying the quantity of polyisocyanate and water employed in their production. Cellular polyurethane plastics may be used in a variety of commercial applications including both thermal and sound insulation, cushions, upholstery units, crash pads and arm rests for automobiles and the like. Non-porous polyurethane plastics have good abrasion and tear resistance and can be used in the production of gears, gaskets, driving members, accumulation bladders, automobile tires and a whole host of other applications.

The invention is further illustrated by the following examples in which the parts are by weight unless otherwise indicated.

Example 1

About 100.0 parts of a branched polypropylene glycol having an —OH number of about 56, about 44.0 parts of toluylene diisocyanate, about 1.5 parts of a water-soluble silicone-ethylene oxide copolymer, about 0.5 part of dibutyl-tin-diacetyl-acetonate, about 0.3 part of dimethyl-aminopropyl ethyl ether, and about 3.5 parts of water are mixed mechanically and the foamable reaction mixture thereby obtained is placed in a mold. The mixture immediately starts to foam and quickly solidifies into an elastic foam material, which is free from cracks and which does not shrink after curing.

Example 2

About 100.0 parts of a polyester of adipic acid, diethylene glycol and hexanetriol having an —OH number of about 56, about 43.0 parts of toluylene diisocyanate, about 0.4 part of dibutyl-tin-diacetylacetonate, about 1.5 parts of sulphonated castor oil (50 percent in water), about 1.0 part of a sulphonated ricinoleic acid (50 percent in water), and about 2.0 parts of water are mixed mechanically and the foamable reaction mixture thereby obtained is placed in a mold. The mixture immediately starts to foam and quickly solidifies into an elastic foam material, which is free from cracks and which does not shrink after curing.

Example 3

100 parts by weight of a linear polypropylene glycol (OH number 56), 45 parts by weight of toluylene diisocyanate, 1.5 parts by weight of a basic silicone oil prepared by transesterification of 1 mol of $$C_2H_5O-(Si(CH_3)_2O)_9C_2H_5$$

with 2 mols of ethanol amine, 0.4 part by weight of 1-ethoxy-3-dimethyl amino propane, 3.5 parts by weight of water and 0.3 part by weight of a dibutyl tin-bis-(aceto acetic acid ester)-complex obtained by transesterification of 1 mol of dibutyl dimethoxy tin with 2 mols of aceto acetic acid ester (refraction index $n_D^{20}$ 1.5077) are mixed in a machine. The foamable mixture thereby obtained is placed in a mold and yields a rapidly rising and hardening foam with good mechanical properties.

Example 4

100 parts by weight of a polyether isocyanate (9% NCO) obtained by reacting together 100 parts by weight of a linear polypropylene glycol (OH number 56) with 37.3 parts by weight of toluylene diisocyanate, 1 part by weight of polydimethyl silioxane, 0.5 part by weight of permethylated N-amino ethyl piperazine, 1.9 parts by weight of water and 0.2 part by weight of a dibutyl tin-bis-(cyclopentanone-2-carboxylic acid ethyl ester)-complex obtained in accordance with Example 3 from the dimethoxy compound and the complex former and having a refraction index $n_D^{20}$ 1.5225, result, when foamed, in a foam being free of cracks.

Example 5

100 parts by weight of a branched polypropylene glycol obtained by addition of propylene oxide to a mixture of propane diol-1,2 and trimethylol propane (mol ratio 1:1) and having an OH number of 56, 36 parts by weight of toluylene diisocyanate, 2.8 parts by weight of water, 1.5 parts by weight of a silicone alkylene oxide copolymer, and 1 part by weight of dioctyl tin-bis-(aceto acetic acid ester)-complex obtained in accordance with Example 3 and having a refraction index $n_D^{20}$ 1.4905, result after being mixed in a machine in a rapidly rising and hardening foam.

Density _____ kg./m.³__ 38
Elasticity _____ Percent__ 44
Elongation at break _____ do____ 235
Tearing strength _____ kg./cm.²__ 1.2

Example 6

100 parts by weight of the polypropylene glycol of Example 5, 38 parts by weight of toluylene diisocyanate, 1.5 parts by weight of the silicone oil of Example 5, 2.8 parts by weight of water, 0.5 part by weight of 1-ethoxy-3-dimethylamino propane and 1 part by weight of dibenzyl tin-bis-acetyl acetonate obtained in a highly viscous form from equivalent amounts of dibenzyl tin dichloride and sodium acetyl acetonate result after being mixed in a machine in a rapidly rising and hardening foam with good mechanical properties.

It is to be understood that any of the other isocyanates, organic compounds containing active hydrogen containing groups, tin chelate or other additive described herein can be substituted for the ones used in the preceding examples with equally satisfactory results.

Although the invention has been described in considerable detail for the purpose of illustration, it is to be understood that variations may be made therein by those skilled in the art without departing from the spirit of the invention and the scope of the claims.

What is claimed is:

1. The method of catalyzing the reaction between an organic isocyanate and an organic compound containing at least one active hydrogen containing group as determined by the Zerewitinoff method which comprises mixing said materials in the presence of a catalytic amount of an organo-tin chelate chelated with an organic chelating agent and containing at least one carbon to tin bond.

2. The method of catalyzing the reaction between an organic polyisocyanate and an organic compound containing active hydrogen containing groups, said groups being selected from the group consisting of hydroxyl groups, primary amino groups, secondary amino groups, carboxy groups and mercapto groups which comprises mixing said materials in the presence of a catalytic amount of an organo-tin chelate chelated with an organic chelating agent and containing at least one carbon to tin bond.

3. The method of catalyzing the reaction between an organic polyisocyanate and an organic compound containing at least two active hydrogen containing groups, said groups being selected from the group consisting of hydroxyl groups, primary amino groups and secondary amino groups to prepare a polyurethane plastic which comprises mixing said materials in the presence of a catalytic amount of an organo-tin chelate chelated with an organic chelating agent and containing at least one carbon to tin bond.

4. The method of catalyzing the reaction between an organic polyisocyanate and a organic compound containing at least two active hydrogen containing groups, said active hydrogen containing groups being predominantly secondary hydroxyl groups, and water to prepare a cellular polyurethane plastic which comprises mixing said materials in the presence of a catalytic amount of an organo-tin chelate chelated with an organic chelating agent and containing at least one carbon to tin bond.

5. The method of catalyzing the reaction between an organic isocyanate and an organic compound containing at least one active hydrogen containing group which comprises mixing said materials in the presence of a catalytic amount of an organo-tin chelate selected from the group consisting of tetravalent tin chelates of β-diketones, o-hydroxyphenones and acetoacetic esters, said chelates containing at least one carbon to tin bond.

6. The method of catalyzing the reaction between an organic polyisocyanate and an organic compound containing at least two active hydrogen containing groups as determined by the Zerewitinoff method which comprises mixing said materials in the presence of a catalytic amount of a dialkyl tin chelate chelated with an organic chelating agent.

7. The method of catalyzing the reaction between an organic polyisocyanate and an organic compound containing at least two active hydrogen containing groups as determined by the Zerewitinoff method which comprises mixing said materials in the presence of a catalytic amount of dibutyl tin diacetylacetonate.

8. In the preparation of a cellular polyurethane plastic by a process which comprises reacting an organic polyisocyanate with a polyhydric polyalkylene ether and water, the improvement which comprises mixing said reactants with from about 0.001 percent to about 5 percent by weight of a dialkyl tin chelate chelated with an organic chelating agent.

References Cited in the file of this patent

UNITED STATES PATENTS 2,933,462    Fischer _____ Apr. 19, 1960

OTHER REFERENCES

Union Carbide—Australian Abstract 44,550/58, June 25, 1959.

Saunders et al.: Chem. Review, 1958, vol. 43, pages 203–218.